(12) United States Patent
Desplanques et al.

(10) Patent No.: US 9,032,179 B2
(45) Date of Patent: May 12, 2015

(54) DEVICE FOR SELECTING AND CONFIGURING A DEFAULT STORAGE SECTION AND THE CORRESPONDING METHOD

(75) Inventors: Bart Desplanques, Edegem (BE); Koën Muylkens, Keerbergen (BE)

(73) Assignee: Thomson Licensing (FR)

( * ) Notice: Subject to any disclaimer, the term of this patent is extended or adjusted under 35 U.S.C. 154(b) by 964 days.

(21) Appl. No.: 12/998,415

(22) PCT Filed: Oct. 23, 2009

(86) PCT No.: PCT/EP2009/063958
§ 371 (c)(1),
(2), (4) Date: Jul. 8, 2011

(87) PCT Pub. No.: WO2010/046465
PCT Pub. Date: Apr. 29, 2010

(65) Prior Publication Data
US 2011/0264883 A1    Oct. 27, 2011

(30) Foreign Application Priority Data

Oct. 24, 2008   (EP) .................................... 08447044

(51) Int. Cl.
*G06F 13/00*   (2006.01)
*G06F 3/06*    (2006.01)

(52) U.S. Cl.
CPC ............ *G06F 3/0632* (2013.01); *G06F 3/0605* (2013.01); *G06F 3/0622* (2013.01); *G06F 3/0631* (2013.01); *G06F 3/067* (2013.01)

(58) Field of Classification Search
CPC .......... G06F 12/14; G06F 13/00; G06F 12/00
See application file for complete search history.

(56) References Cited

U.S. PATENT DOCUMENTS

| 6,678,828 | B1 | 1/2004 | Pham et al. |
| 2003/0182494 | A1 | 9/2003 | Rodriques et al. |
| 2005/0091454 | A1 | 4/2005 | Shimada et al. |

(Continued)

FOREIGN PATENT DOCUMENTS

| CN | 1828554 | 9/2006 |
| EP | 1320239 | 6/2003 |

(Continued)

OTHER PUBLICATIONS

Methvin, "Mount Point Magic", News & Views, vol. 3, Issue 6, Jun. 2005, pp. 1-3.

(Continued)

*Primary Examiner* — Sean D Rossiter
(74) *Attorney, Agent, or Firm* — Jack Schwartz & Associates, PLLC

(57) ABSTRACT

The present invention concerns a device and a method at the device for selecting and configuring a default storage section. The device comprises connecting means for connecting at least one storage device comprising storing means to the device, characterized in that it comprises a selector for selecting a storage device, the selected storage device becoming the default storage section, configuring means for, on selection of a default storage section, partitioning the storing means of the default storage section into more than one directory, and securing means for defining access rights to the more than one directory.

9 Claims, 4 Drawing Sheets

(56) References Cited

U.S. PATENT DOCUMENTS

| | | |
|---|---|---|
| 2005/0235128 A1 | 10/2005 | Rustagi et al. |
| 2006/0053438 A1 | 3/2006 | Miyazawa |
| 2006/0184806 A1* | 8/2006 | Luttmann et al. ............ 713/193 |
| 2007/0156703 A1 | 7/2007 | Murotani et al. |
| 2008/0154777 A1 | 6/2008 | Achiwa |
| 2009/0019510 A1 | 1/2009 | Duflot |

FOREIGN PATENT DOCUMENTS

| | | |
|---|---|---|
| EP | 1505788 | 2/2005 |
| EP | 1686505 | 8/2006 |
| FR | 2864741 | 7/2005 |
| JP | 2007164597 | 6/2007 |
| WO | WO2004040412 | 5/2004 |
| WO | WO2005089446 | 9/2005 |

OTHER PUBLICATIONS

Microsoft: "Install Windows XP", [Online}, Sep. 7, 2007, pp. 1-12.
Int'l Search Report Dated Jan. 12, 2010 and European Search Report Dated Mar. 30, 2009.
Ito et al., "Automatic Reconfigurationof an Autonomous Disk Cluster", Proceedings of the 2001 Pacific Rim International Symposium on Dependable Computing, Seoul, Korea, Dec. 17, 2001, pp. 169-172.
Hariharan, P. C., "Evolution of Mass Storage Systems: Issues and Challenges", Journal of the Magnetics Society of Japan, vol. 25, No. 5, 2001, pp. 1245-1251.

* cited by examiner

|  |  | Managed partition |
|---|---|---|
| Western Digital (Disk1) | Unmount | |
| partition 1 | 120 GB | 80 GB Free | ● |
| partition 2 | 60 GB | 1 GB Free | ○ |
| partition 3 | Unrecognized or unformatted partition | Format |
| Maxtor (Disk 2) | Unmount | |
| partition 1 | 200 GB | 164 GB Free | ○ |
|  | No Managed partition: | ○ |

FIG. 4

DEVICE FOR SELECTING AND CONFIGURING A DEFAULT STORAGE SECTION AND THE CORRESPONDING METHOD

This application claims the benefit, under 35 U.S.C. §365 of International Application PCT/EP2009/063958, filed Oct. 23, 2009, which was published in accordance with PCT Article 21(2) on Apr. 29, 2010 in English and which claims the benefit of European patent application No. 08447044.2, filed Oct. 24, 2008.

FIELD OF THE INVENTION

The present invention relates generally to network attached storage devices and in particular to a method at a device for selecting and configuring such devices.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The main purpose of a Network Attached Storage device (NAS) is to offer storage services to other devices on a network. A NAS device is usually a server that is accessible from clients to store data. A residential gateway is a network device adapted to connect a local network to the Internet, More and more high-end residential gateways are equipped with at least one USB master port. A USB port allows connecting USB devices such as storage devices, printers, and webcams. When a USS storage device such as a USB hard drive or a USB memory stick is connected to the gateway, the gateway can export some files on the storage device to the home network or to the Internet.

Two approaches are used for sharing files over a LAN on a NAS device. In a first approach, all content and files of a connected disk are exported for all users as soon as a disk is connected. It is then easy to connect files and share files quickly. However, any user can access any files on the disks. In a second approach, a user configures each disk via a user interface. In particular, he indicates which files and directory is exported to which disk, and also which user is allowed to use a given content item. This provides flexibility and security. However, this requires a lot of configuration before files can be used.

SUMMARY OF THE INVENTION

The present invention attempts to remedy at least some of the concerns connected with the selection of a disk in the prior art, by providing a method in the gateway for automatically selecting and configuring a disk.

The present invention concerns a device for selecting and configuring a default storage section. To this end the device comprises connecting means for connecting at least one storage device comprising storing means to the device, characterized in that it comprises a selector for selecting a storage device, the selected storage device becoming the default storage section, configuring means for, on selection of a default storage section, partitioning the storing means of the default storage section into more than one directory, and securing means for defining access rights to the more than one directory.

The device facilitates the selection of a disk. The end user is not intended to perform the disk selection. When selected the disk is automatically partitioned into directories accessible with access rights. Again this doesn't require any input from of an end user. The device of the invention facilitates the configuration of a default disk.

According to an embodiment, the configuring means creates a directory for at least one application running on the device, the directory storing data used by the at least one application.

The selected storage device is used to store the files used by the applications running on the device.

According to an embodiment, the device comprises identifying means for getting the list of end users authorized to access the device, the configuring means creating a directory for each one of the end users.

The selected storage device automatically creates a default directory for each one the registered end users.

According to an embodiment, the securing means defines access right to the more than one directory for each one of the end users.

According to an embodiment, the device comprises marking means for identifying the default storage section.

Preferably, the marking means creates and sends a marking file to the default storage section.

According to an embodiment, the configuring means partition a piece of the storing means.

Another object of the invention is a method for selecting and configuring a default storage section. To this end, the method comprises, at a device, the steps of detecting at least one storage device connected to the device, the at least one storage device comprising storing means, selecting a storage device among the at least one the storage device, the selected storage becoming the default storage section and partitioning the storing means of the default storage section into more than one directory, with access rights to the more than one directory.

Another object of the invention is a computer program product comprising program code instructions for executing the steps of the method according to the invention, when that program is executed on a computer. By "computer program product", it is meant a computer program support, which may consist not only in a storing space containing the program, such as a diskette or a cassette, but also in a signal, such as an electrical or optical signal.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

FIG. 4 represents a user interface according to the embodiment.

In FIGS. 1 and 2, the represented blocks are purely functional entities, which do not necessarily correspond to physically separate entities. Namely, they could be developed in the form of hardware or software, or be implemented in one or several integrated circuits.

Detailed Description of Preferred Embodiments

The exemplary embodiment comes within the framework of a gateway, but the invention is not limited to this particular environment and may be applied within other frameworks where a device connects to an external memory. In particular it may be applied to a Network Attached Storage device.

Figure 1:
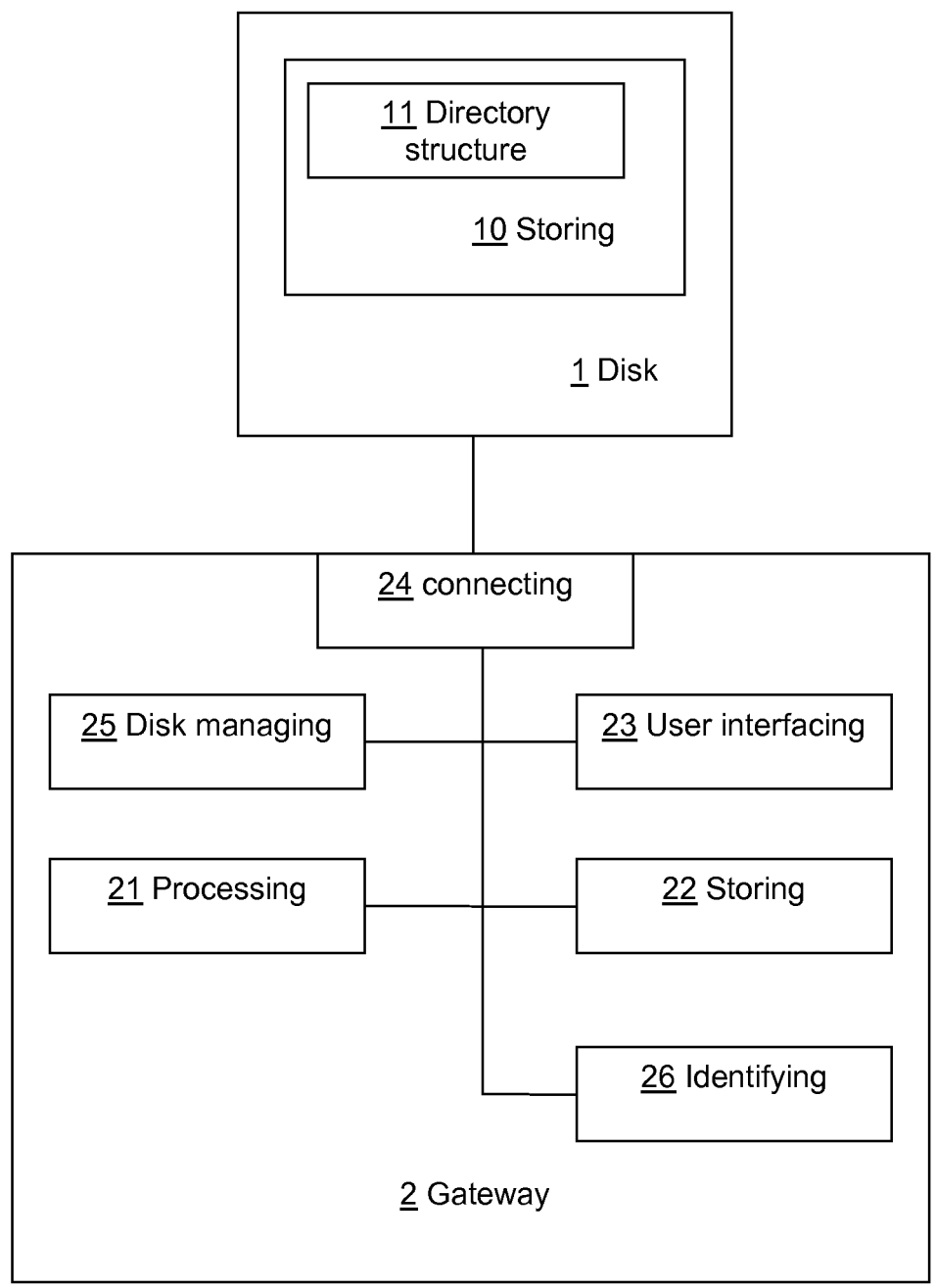
FIG. 1 is a block diagram of an object compliant with the embodiment.

The gateway 2 according to the embodiment is illustrated in FIG. 1. It comprises a connecting module 24 for temporarily connecting to a disk 1. In particular the connecting module is an USB port compliant to the USB standard. Of course the connecting module could be any other type of connecting means well known to the skilled in the art, such as an Ethernet port or a wireless LAN or PAN interface. The connecting module enables to connect a disk to the gateway. The connecting module could either comprise more than one USB or Ethernet port. The connecting module may also permit to connect the gateway to a local area network.

A disk 1, which is a USB mobile drive, may be temporarily connected to the gateway. Of course it could be any other disk type such as a USB memory stick, a USB hard disk. More generally, it could be any type of device comprising persistent storing module, such as a hard drive in a device such as a laptop, a set-top box, a digital video recorder device. The disk comprises a storing module 10, and a directory structure 11 in the storing module as defined hereinafter.

The gateway according to the embodiment comprises a mechanism to mark a disk as a special disk as detailed hereinafter. This special disk is referred to as the default disk, or the managed disk. The managed disk is configured as detailed below to enable security with a minimum configuration and to enable new applications managed by the gateway. The gateway manages the disk with a minimum of user input. Of course, and as illustrated hereinafter, the managed disk may be a partition of a disk; it is called a managed partition.

The gateway comprises a user interface 23 that is adapted to enable the selection of the managed disk. When a disk is detected at the USB interface, it appears in the user interface. A user interface according to the embodiment is represented in FIG. 4. It represents two disks, Disk 1 and Disk 2. Disk 1 is split into three partitions. Partition 1 size is 120 Gigabytes; where 80 Gigabytes are not used. Partition 2 size is 60 Gigabytes; where 1 Gigabyte is not used. A third partition, partition 3, is not formatted. Partition 1 has been selected as the managed partition. The user interface offers the possibility to format the Partition 3. Disk 2 comprises only one partition, partition 1, which is 200 Gigabytes and where 164 Gigabytes are not used. Partition 1 has been selected as the managed partition.

The gateway comprises a processing module 21 such as a processor for driving the other modules of the gateway. The gateway comprises a storing module 22 for storing the managed disk identifier as indicated hereinafter. It also stores the list of end users registered at the gateway. The storing module is a persistent memory. It is preferably a flash memory. More generally, the gateway comprises an identifying module (26) that gets the list of end users enabled to access the gateway. These end users generally identify themselves to be able to access the gateway with a login/password. More generally the list of end user comprises the end users authorized to access the home network to which the gateway is connected.

In particular, the gateway comprises a number of servers: SMB server, FTP server, HTTP server. When a user connects to one of these servers, either using a web browser, an FTP client or browsing to the GUI, a username password is asked. The servers are configured so that the user only sees his own home directory when he logs in. For example when the end user connects to the FTP server of the gateway, he automatically gets in his home directory after giving the correct username/password. In addition a user management module is present in the gateway; it includes a user interface to add users and to change passwords of users.

Figure 2:
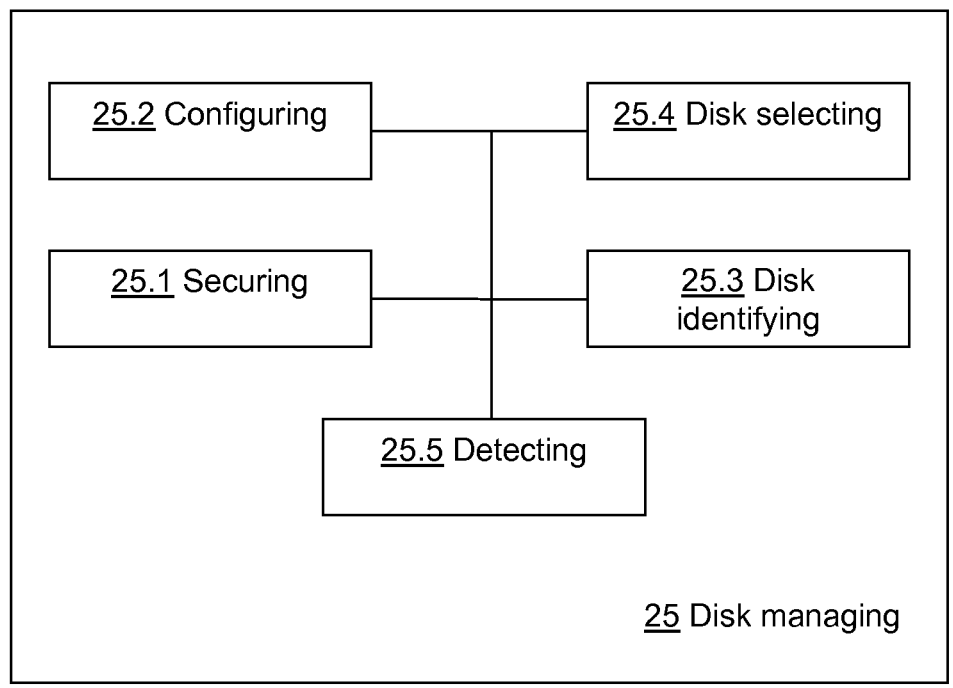
FIG. 2 is a block diagram of a disk managing module according to the embodiment.

The gateway comprises a disk managing module 25 for configuring the managed disk. It is further described in FIG. 2. The disk managing module 25 is adapted to manage and configure the managed disk. It comprises a disk selecting module 25.4 for selecting a disk as the managed disk. The selection is performed with an end user at the user interface. The user interface enables an end user to select the disk as the managed disk. The user interface also permits to configure the managed disk, as detailed hereinafter. When the user confirms the change, the storage configuration module receives an event. A directory structure is created and a marker is placed on the gateway flash and the hard disk.

A detecting module 25.5 permits to detect when a disk is connected to the gateway. A disk identifying module 25.3 permits to mark the disk as the managed disk. When the managed disk is selected, the disk identifying module creates a marker file containing a time-stamp on the persistent memory of the gateway. It also puts a copy of the marker on the USB disk. The marker is used to recognize if a disk is the managed disk; whenever and wherever the disk is connected to the gateway.

In addition, the marker is used to detect the managed disk when the managed disk is moved from one interface (e.g. USB port_1) to another interface (e.g. USB port_2).

In addition, as all disks don't have a unique Hardware ID, the marker allows recognizing the disk of any type when the disk is disconnected/re-connected or after a reboot.

It will be appreciated that it is possible to associate a timestamp to the mark. The timestamp indicates the life time of the mark.

The gateway comprises a configuring module 25.2 for configuring the managed disk. In particular it creates a directory structure in the managed disk. The directory structure partitions the storing module of the managed disk into a plurality of storing areas. In the directory structure, it creates a directory specifically for each one of the end users registered in the data base of the gateway. The gateway comprises means, not represented, for registering more than one end user. The list of end users is stored in a database. The configuring module can access the database to check the registered end users and then create corresponding directories. When a new end user is registered, a new directory is created. When an end user is removed from the database, the corresponding directory is removed from the disk.

According to an embodiment, the list of end users for whom a directory structure is created is configurable. The list of registered users appears at the user interface. The user interface comprises means for enabling to select some users in the list of end users. The gateway then creates a directory structure only for the selected users.

Access to each directory structure is then limited to each one of the end users. This is performed by the securing module 25.1. When a user connects to the gateway, it is identified with a login and password. The user then only accesses his directories. He doesn't access other users' directories. Of course, the users registered in the database could have different levels of right. For example a first user has high level and other users have low level. The first user can access all directories, and other users only access their directories.

Figure 3:
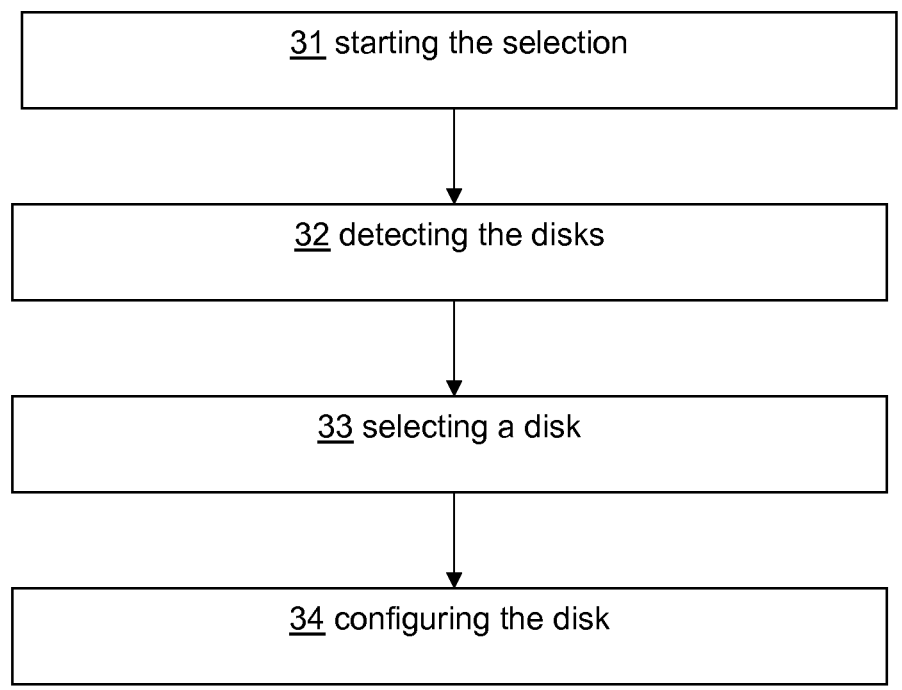
FIG. 3 is a flow chart illustrating the disk selection procedure.

The procedure to select and configure the managed disk is illustrated in FIG. 3. No managed disk has been registered in the gateway. The end user initiates the managed disk selection 31. He selects on the user interface an icon to start the selection. When started, the gateway presents the list of disks available, and candidate for being a managed disk 32. The end user may also connect a disk at the gateway interface, and that disk appears in the list of disks available. The end user selects on the user interface a disk as the managed disk 33. The gateway then automatically configures the managed disk 34. A directory is created for each one of the registered end user.

Alternatively, after the end user initiates the managed disk selection, the first disk connected to the gateway is elected as the managed disk. More precisely, the first disk connected to the gateway during a time frame is elected as the managed disk.

Alternatively, the gateway has a plurality of USB ports. One USB port is reserved to connect the managed disk. The disk connected to this port is selected as the managed disk. The disks connected to the other ports are non-managed disks.

Later, when a disk is connected to the gateway, the gateway performs the identification of the disk as follows. The connection of the disk triggers an event. The detecting module is made aware that a disk is connected, and adds the disk to the list of the connected disks. The Disk identifying module checks if a marker is present on the flash of the gateway. If a marker is present on the Flash, the Disk identifying module checks if a marker is present on the USB disk. It reads the USB disk to check the presence of a marker. If a marker is present, and if both markers match, the gateway concludes that the disk is the managed disk. The directory structure is verified. If the directory structure is not present anymore (e.g. a user deleted it when the disk was connected directly to another device), it is created again.

If the markers do not match, the disk is not the current managed disk. No further action taken. If no marker is present in the disk, the disk is not a managed disk. No Further action taken.

The managed disk provides a secure file sharing solution with little configuration. It may also be considered as the disk that should always be connected to the gateway to enable applications. It could be the disk that stores voice message of a voice over IP answering machine embedded in the gateway. It could also be the disk that stores a picture gallery. More generally the disk may be considered as the default disk that stores data for applications of the gateway.

According to the embodiment, the gateway selects only one disk as the managed disk. This disk is used to contain all home directories, or any other applications that need a disk permanently connected to the gateway.

According to the embodiment, the managed disk function can migrate from one disk to another disk. The gateway comprises a managed disk migration module which copies the full pre-defined directory structure, including contents, from one disk to another disk.

A wizard is initiated when another disk is selected as the managed disk. It starts the transfer via the managed disk migration module after confirmation by the user. If the old managed disk is not connected, the wizard can prompt the user to connect the old managed disk so that the transfer can take place.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A gateway device adapted to connect a local network to the Internet comprising:
    at least one USB or wireless LAN interface for connecting said gateway device to at least one storage device;
    a user interface for selecting a storage device of the at least one storage device connected to said gateway device, said selected storage device becoming a managed storage section of said gateway device;
    a disk identifying module configured to mark said selected storage device so that said gateway device can identify if a storage device connected to said gateway device is the selected storage device;
    a configuring module configured to obtain a list of end users authorized to access said gateway device;
    the configuring module being further configured to, on selection of a managed storage section, automatically partition said managed storage section into a directory structure of a plurality of directories wherein a directory is created for each one of said end users, said directory structure comprising a directory for at least one application running on said gateway device for storing data used by said application; and
    a securing module configured to define access rights to said plurality of directories respectively for each end user registered to said gateway device.

2. Device according to claim 1, wherein said disk identifying module is configured to create and send a marking file to said managed storage section.

3. Device according to claim 1, wherein said configuring module is configured to partition a piece of said storing section.

4. Device according to claim 1, wherein said disk identifying module is configured to associate a timestamp with the mark to indicate the lifetime of the mark.

5. Method for selecting and configuring a managed storage section, comprising, at a gateway device,
    detecting at least one storage device connected to said gateway device, via a USB or wireless LAN interface;
    selecting a storage device from among said at least one storage device, said selected storage device becoming a managed storage section of said gateway device;
    marking said selected storage device so that said gateway device can identify if a storage device connected to said gateway device is the selected storage device;
    obtaining a list of end users authorized to access said gateway device;
    partitioning the managed storage section into a directory structure of a plurality of directories wherein a directory is created for each one of said end users, said directory structure comprising a directory for at least one application running on said gateway device for storing data used by said application; and defining access rights to said plurality of directories for each end user registered to said gateway device.

6. Computer program product, comprising program code instructions on a non-transitory medium for executing the steps of the method according to claim 5 when said program is executed on a computer.

7. The method according to claim 5, further comprising creating and sending a marking file to said managed storage section.

8. The method according to claim 5, further comprising partitioning a piece of said managed storage section.

9. The method according to claim 5, further comprising associating a timestamp with the mark to indicate the lifetime of the mark.

\* \* \* \* \*